United States Patent [19]

Pieski et al.

[11] 4,248,990
[45] Feb. 3, 1981

[54] NONRANDOM COPOLYMERS OF ETHYLENE AND UNSATURATED ACID

[75] Inventors: Edwin T. Pieski, Fairfax; Thomas F. Sashihara, Wilmington, both of Del.

[73] Assignee: E. I. Du Pont de Nemours & Company, Wilmington, Del.

[21] Appl. No.: 27,455

[22] Filed: Apr. 5, 1979

[51] Int. Cl.³ ............................ C08F 2/02; C08F 8/44; C08F 220/06; C08F 222/02
[52] U.S. Cl. .................................... 526/317; 525/360; 525/366; 525/367; 525/369; 526/318
[58] Field of Search ................ 526/317, 318; 525/360, 525/366, 367, 369

[56] References Cited
U.S. PATENT DOCUMENTS

| | | | |
|---|---|---|---|
| 3,264,272 | 10/1966 | Rees | 526/26 |
| 3,472,825 | 10/1969 | Walter et al. | 526/317 |
| 3,520,861 | 7/1970 | Thomson et al. | 526/317 |
| 4,042,766 | 8/1977 | Tatsukami et al. | 526/16 |
| 4,061,847 | 12/1977 | Hughes et al. | 526/16 |

*Primary Examiner*—John Kight, III

[57] ABSTRACT

Compositionally uniform but nonrandom copolymers of ethylene and α,β-ethylenically unsaturated carboxylic acids having from 3 to 8 carbon atoms are provided having an acid content of from about 6 to about 35 weight percent, a melt index of from about 0.1 to about 800, and a ratio of weight percent adjacent acid to weight percent total acid in the copolymer of from about 0.44 to about 1.0. These copolymers have improved physical properties such as hardness, stiffness, heat resistance and creep resistance. Further provided, is a process for preparing these copolymers in a constant environment stirred autoclave in a continuous manner wherein the reaction zone is maintained in a steady state at a pressure of from 0 to about 500 psi above, and at a temperature of from 0° to about 15° C. above that needed to maintain a single phase reaction mixture at a given concentration of copolymer and at the given acid comonomer content of the copolymer.

18 Claims, No Drawings

NONRANDOM COPOLYMERS OF ETHYLENE AND UNSATURATED ACID

FIELD OF THE INVENTION

This invention relates to ethylene copolymers and more specifically it relates to compositionally uniform but nonrandom copolymers of ethylene and $\alpha,\beta$-ethylenically unsaturated acids having a ratio of weight percent adjacent acid to total weight percent acid in the copolymer of from about 0.44 to about 1.0.

DESCRIPTION OF THE PRIOR ART

Solid ethylene/$\alpha,\beta$-ethylenically unsaturated carboxylic acid (e.g., methacrylic acid) random copolymers (E/MAA) are known and widely used in both the acid form and as the partially neutralized derivatives (ionomers) because of their desirable properties and ease of fabrication. However, the copolymers and ionomers of commerce have limited stiffness, hardness, creep resistance, and high temperature resistance because the acid comonomer in a widely dispersed, substantially random sequence distribution effectively destroys the crystallinity without adding a compensating rigid structure.

Ethylene/methacrylic acid or ethylene/acrylic acid copolymers made in batch autoclave or continuous tubular reactors are not compositionally uniform.

Canadian Pat. No. 655,298 describes compositionally uniform, random ethylene copolymers with ethylenically unsaturated carboxylic acids containing up to 10 percent by weight acid. The examples show the preparation of copolymers containing up to 5.7% by weight acid comonomer. Because of their low comonomer content and their conditions of synthesis, the percent adjacent acid level of these random copolymers is too low to result in a percent adjacent acid to total weight percent acid in the copolymer ratio of 0.44 or higher.

Thomson and Waples U.S. Pat. No. 3,520,861 discloses a process for making in a continuous, well-stirred, autoclave ethylene copolymers said to have uniform composition and statistically random sequence distribution where "any regulating or ordered sequence [is] negligible" (column 1, lines 65–68) containing from about 0.1 to about 35 percent acid such as acrylic, methacrylic or crotonic acid. These copolymers are disclosed to possess limited "rigidity" (stiffness). None of them appears to have greater than 31 kpsi rigidity and most of them, as indicated in the examples are in the range of 10 to 20 kpsi. From their properties and from the theory of random copolymerization it is estimated that these copolymers have ratios of weight percent adjacent acid to weight percent total copolymerized methacrylic acid below 0.44, in the range of about 0.1 to 0.39.

SUMMARY OF THE INVENTION

According to the present invention there are provided compositionally uniform but non-random copolymers of ethylene and $\alpha,\beta$-ethylenically unsaturated carboxylic acid, the acid having from 3 to 8 carbon atoms and the copolymer containing on a weight basis from about 6 to about 35 percent acid, preferably from about 10 to about 25 percent acid, having a melt index of from about 0.1 to about 800, and having a ratio of weight percent adjacent acid to total weight percent acid in the copolymer of from about 0.44 to about 1.0.

All percentages of acid comonomer are weight percent values unless otherwise specifically noted.

Further provided according to the present invention are compositionally uniform ionic copolymers, termed ionomers, of ethylene and $\alpha,\beta$-ethylenically unsaturated carboxylic acid, the acid having from 3 to 8 carbon atoms, the copolymer containing, on a weight basis, from about 6 to about 35 percent acid, having from about 5 percent to about 90 percent of the carboxylic acid groups ionized by neutralized with metal ions having an ionized valence of from one to three inclusive when the unsaturated acid is a mono-carboxylic acid and an ionized valence of one when the unsaturated acid is a dicarboxylic acid and the metal ions being selected from the group consisting of uncomplexed and complexed metal ions, the copolymer having a melt index of from about 0.01 to about 100 and a ratio of percent adjacent acid to weight percent acid in the copolymer of from about 0.44 to about 1.0.

Still further provided according to the present invention is a process of preparing in a constant environment stirred autoclave the above referred to compositionally uniform but non-random copolymers of ethylene by continuously charging ethylene, the acid and free radical initiator into a reaction zone maintained in a steady state at a pressure of from 0 to about 500 psi above, and at a temperature of from 0° to about 15° C. above that needed to maintain a single phase reaction mixture at the given concentration of copolymer in the reaction mixture and at the given acid comonomer concentration in the copolymer, the ethylene and acid being charged in a ratio of from about 15:1 to about 200:1, respectively, converting from about 5 to about 20 percent by weight of the monomers to copolymer, and continuously removing the copolymer and unreacted monomers from the reaction zone.

In the context of the present invention the phrase "compositionally uniform", as it relates to copolymers, means that substantially all of the copolymer molecules have substantially the same chemical composition while, of course, their molecular weight (length of the molecules) can vary.

DETAILED DESCRIPTION OF THE INVENTION

It was found that using a continuous, wellstirred, constant environment autoclave, ethylene/acid, such as methacrylic acid, copolymers can be made that are compositionally uniform and have ratios of the percent adjacent acid (i.e., the percent of the MAA that is in pairs or diads) to the total weight percent of MAA as high as about 1.0 by copolymerizing ethylene and methacrylic acid in the presence of a free-radical initiator in a reaction zone maintained in a steady state at a pressure of from 0 to about 500 psi above, and at a temperature of from 0° to about 15° C. above that needed to maintain a single phase reaction mixture at the given concentration of copolymer in the reaction mixture and at the given acid comonomer content of the copolymer.

The ratio of ethylene feed to acid comonomer feed can vary from about 15/1 to 200/1 in making these copolymers. The preferred range is from about 20/1 to about 100/1 because of the economics of making these copolymers. The conversion of monomers to copolymer can vary from about b 5% to about 20%. The preferred range is from about 8% to about 16% because of economics and in order to assure compositional uniformity. The residence time can vary from about 5 seconds to 15 minutes depending on reactor volume and rate of throughput, preferably 30 seconds to four minutes.

In the case of acrylic acid, the temperatures required to make the products of this invention are substantially lower than for other acid comonomers. In general, for acrylic acid, the polymerization temperature should be substantially below 140° C., whereas for methacrylic acid or other acids within the invention, temperatures in the range of 150° to 175° C. are suitable, depending on pressure, monomer concentration, solvent concentration and residence time.

These new products have higher stiffness, higher hardness, higher yield point, higher resistance to creep and higher resistance to deformation by heat than is known in commerical products or taught in the prior art. Therefore, they are more attractive in applications (such as refrigerator door liners) requiring good physical properties. At synthesis temperatures and pressures above the range specified above, the copolymers are substantially random and hence have lower ratios of percent adjacent acid to total weight percent methacrylic acid and thus do not have the improved properties. At synthesis temperatures and pressures below the range of the present invention as indicated above two phasing occurs, adhesions form in the reactor, and the constant environment conditions required to obtain compositionally uniform copolymers cannot be sustained. The percent adjacent acid can be measured by using the gentle pyrolysis/infrared absorption analysis described in detail in Examples 1 to 10.

The conditions under which a second phase separates from the fluid within the autoclave during the synthesis of ethylene/methacrylic acid copolymers depends upon the synthesis temperature, the synthesis pressure, the concentration of copolymer in solution (i.e., the overall conversion), the concentration of comonomer in the copolymer, the molecular weight (melt index) of the copolymer and the nature and amount of other substances present in the reaction mixture (e.g., benzene that may be used as an initiator carrier, acetone that may be used as a methacrylic acid carrier or cyclohexane that may be used as a telogen). Because of the large number of variables, it is not practical to define the exact conditions for all the states where two phases are formed in the synthesis solution. However, it is possible to test for the position of the phase boundary by observing changes in the process and the product when synthesis conditions are changed in a regular manner (for example, by decreasing the synthesis temperature or pressure in small steps) to pass through that boundary. In going from one-phase operation to two-phase operation in such a test, the process will shown an increase in initiator demand, will develop a significant temperature spread in the reactor, form adhesions within the reactor, cause pressure instabilities and slow down the stirring at constant power or require more power to maintain constant speed. At the same time, the product from these tests made in the two-phase region will show a narrower molecular weight distribution by gel permeation chromatography, a decrease in the slope of the shear rate-shear stress curve for the melt, an increase in the environmental stress crack resistance, an increase in the maximum draw rate for film or filament, and an increase in the Percent Adjacent Acid. The magnitude of these changes will, of course, depend upon the magnitude of the stepwise changes and of the composition of the two phases, but those skilled in the art can determine the position of the phase boundary by using these criteria. The novel copolymers of the present invention are normally solid, compositionally uniform copolymers of ethylene and acid, such as methacrylic acid, that have sufficient methacrylic acid units in pairs (or diads) to give a ratio of the percent of adjacent acid units to the weight percent of methacrylic acid in the copolymer of from about 0.44 to about 1.0, which is greater than possible for random copolymer. Preferably the ratio should be from about 0.5 to about 0.8 because such products are easier to prepare and they show additional improvements in properties over those obtained at the 0.44 to 0.5 range. Other acid comonomers such as crotonic acid, itaconic acid, etc., whose homopolymers have high glass transition temperature and whose units will tend to aggregate into glassy domains in an ethylene copolymer will show similarly improved properties.

It is known in the art (cf. U.S. Pat. No. 3,178,404 to Vaughn and Hagemeyer) that decreasing the temperature and increasing the pressure in the synthesis of polyethylene homopolymer decreases the short chain branching in the product, and that lower short chain branching in a polyethylene homopolymer gives higher crystallinity in the product [cf. Sperati, Franta and Starkweather, J. Am. Chem. Soc. 75, 6127 (1953)], and that higher crystallinity in a polyethylene homopolymer gives higher density, stiffness, yield point, hardness, Vicat temperature and other properties (ibid.).

It is also known in the art [cf. Kamath and Wakefield, J. Appl. Pol. Sci. 9, 3153 (1965)] that introducing a comonomer into the polyethylene chain disrupts the crystallinity proportionally to the comonomer content until all the crystallinity (as measured by x-ray) is gone at about 30% comonomer. This loss of crystallinity is accompanied by a loss in the crystallinity dependent properties since it is the crystalline matrix that gives these properties.

We have also observed the disappearance of crystallinity with increasing comonomer content in the ethylene/methacrylic acid copolymers, and crystallinity is substantially absent above about 30% comonomer. It is unexpected and most surprising that our unique non-random copolymers, despite loss of crystallinity, retains excellent and superior solid state properties. The expected loss of stiffness, Vicat temperature and yield point are observed with prior art, random copolymers having a low ratio of the Percent Adjacent Acid to Weight Percent Methacrylic Acid up to about 25% comonomer (compare such data in Tables I, II, III and IV).

However, when the comonomer content is increased above about 25% the stiffness and yield strength increase above the minimum values found at about 25% comonomer. Also, when the acid copolymers are even partially neutralized by metal ions the stiffness and yield strength increase above that of the neutralized product. These increases have been attributed to the formation of glassy domains, a new phase (different from the polyethylene crystallites and the rubbery amorphous regions) that precipitates from the polymer because of high polarity [cf. pp. 156 ff in R. Longworth's Chapter 2 of the book "Ionic Polymers" L. Holliday, ed., John Wiley & Sons, New York (1975)]. These glassy domains coexist with the polyethylene crystallites and the rubbery amorphous region and will contribute to the stiffness and yield strength if they are present in sufficient numbers. High concentrations of acid comonomer and the partial neutralization increase the amounts of glassy domains in the copolymer because of the solubility limits of these materials.

The ethylene/methacrylic acid copolymers that have a high ratio of Percent Adjacent Acid to Weight Percent Methacrylic Acid also decrease in crystallinity with increase in comonomer content. But the products show higher stiffness and higher yield strength than homopolymers of ethylene made under the same conditions. Their Vicat temperatures are lower than those of polyethylene homopolymer but higher than those of random copolymers having the same comonomer content but lower ratios of Weight Percent Adjacent Acid to Weight Percent Methacrylic Acid. We attribute this result to the presence of larger amounts of the glassy domains in structures that are able to contribute substantially to stiffness and strength but which soften and disintegrate at lower temperatures than similar structures formed by polyethylene crystallites.

It is surprising that the sequence distribution of the ethylene/methacrylic acid copolymers can be changed by changing synthesis conditions. It is further surprising that increasing the amount of adjacent acid in the copolymer would affect the volume, size or structure of the glassy domains at a constant comonomer content, especially in the tiny amounts that they are present and to the extent that properties are changed. $\alpha,\beta$-ethylenically unsaturated carboxylic acids suitable for the present invention have from 3 to 8 carbon atoms. Examples of such monomers are acrylic acid, methacrylic acid, crotonic acid, itaconic acid, maleic acid, fumaric acid, monoesters of said dicarboxylic acids, such as methyl hydrogen maleate, methyl hydrogen fumarate, ethyl hydrogen fumarate, and maleic anhydride. Preferably the acid comonomer is methacrylic acid.

The acid comonomer content should be from about 6 to about 35 weight percent, preferably 10 up to about 25 weight percent. Most preferably the comonomer content is in excess of 10 to about 18 percent by weight.

The compositionally uniform copolymers of the present invention are made in a continuous (feed and take-off), well-stirred, constant environment autoclave of low L/D dimension (i.e., less than about 4/1) under conditions that give a reactivity ratio product for the two comonomers close to one. These conditions are obtained in a narrow band of temperatures, pressures and comonomer content as specified above. Within these narrow limits of synthesis, non-random copolymers are formed that have high values for percent adjacent acid yet are compositionally uniform.

The acid groups in the novel copolymers of the present invention can be neutralized with metallic ions such as sodium, zinc, magnesium, etc. to form ionically crossed-linked materials termed ionomers which are thermoplastic at processing temperatures as taught in U.S. Pat. No. 3,264,272. The neutralization ranges generally from about 5 percent to about 90 percent by weight. Ionomers prepared from the copolymers of the present invention have higher stiffness, hardness and creep resistance than ionomers of commerce. The melt index (as determined by ASTM D-1238-57T, condition E) for the unneutralized copolymers of the present invention can range from about 0.1 to about 800 g/10 minutes. Melt index for the neutralized copolymers can range from about 0.01 to about 100. The preferred melt index for both the neutralized and unneutralized copolymers is from about 0.2 to about 30, in which range optimum processability is obtained.

The following examples serve to illustrate the present invention. All parts and percentages and proportions are by weight unless otherwise indicated.

EXAMPLES 1 TO 10 AND COMPARATIVE EXAMPLES C-1 TO C-6

Ethylene and methacrylic acid were copolymerized to products containing about 10 percent methacrylic acid in a series of runs summarized in Table I. The runs were carried out either in a continuous manner in a 0.72-liter, 2000-atmosphere autoclave having a L/D of 1.24 that had a central agitator shaft carrying several sets of pitched paddle blades and turning at about 1200 rpm to mix the continuously added feed mixture thoroughly with the reaction mixture already in the autoclave to provide a constant environment or in a similar autoclave of 2.0 liter capacity having a L/D of 3.3 and likewise stirred at 1200 rpm in order to provide a constant environment. The autoclave was externally heated to maintain the chosen temperature inside. The feed mixture comprised ethylene and methacrylic acid in the proportion needed to make the desired copolymer and a separate feed consisting of a solution of an appropriate initiator in benzene. The feed rate was about 10 lbs/hr and the hold-up time in the reactor was about four minutes. Conditions in the reaction zone were maintained in a steady state. The initiator is chosen according to the temperature desired for the synthesis; for example, azo-bis-isobutyro-nitrile for 140° to 180° C.;
tert-butyl perisobutyrate for 170° to 210° C.;
tert-butyl peracetate for 190° to 240° C.;
di-ter-butyl peroxide for 230° to 270° C.

The amount of initiator is adjusted to give the desired conversion. The reaction product was released from the autoclave through an automatic pressure let-down valve into a product can at atmospheric pressure. The internal pressure of the reactor was controlled by this let-down valve. Most of the unreacted ethylene, the unreacted methacrylic acid and the benzene was flashed off to waste from the product can. However, in commercial operation, the unreacted monomers are recovered and recycled. The solid copolymer product left in the can was generally milled with about 0.1 percent antioxidant on a 2 roll rubber mill at 150° C. for 10 minutes after banding to remove the remaining ethylene, benzene and methacrylic acid. To some of the runs cyclohexane was added as a telogen in appropriate amounts to assist in controlling the melt index of the copolymer product.

Table I also shows properties of the copolymer products which were determined as follows: methacrylic acid content in percent was measured by titration at 75° to 90° C. in a 75 toluene/25 n-propanol or a 75 xylene/25 n-butanol (by volume) mixture with 0.1 normal potassium hydroxide in methanol using a phenolphthalein end point.

The "Percent Adjacent Acid" was measured by infrared absorbance at 5.65 microns of a lightly pyrolyzed solution of the copolymer. Heating a dry solution of about one gram of the ethylene/methacrylic acid copolymer in 100 ml of an equal volume mixture of Decalin ® decahydronaphthalene and "Ansul Ether" 161, triethylene glycol dimethyl ether at about 200° C. for about one hour causes conversion of essentially all of the adjacent methacrylic acid units to cyclic anhydride as shown by the equation below:

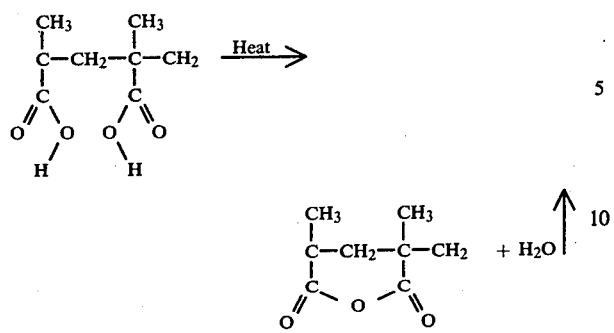

A calibration constant for the infrared absorbance of the carbonyl at 5.65 microns was determined using glutaric anhydride which absorbs at the same infrared wavelength as the carbonyl of the cyclic anhydride obtained from two methacrylic acid units next to each other in the polymer chain. The absorbance at this wavelength was then measured for the hot pyrolyzed solution against a solution of pivalic acid to compensate for the unreacted acid. The Percent Adjacent Acid was calculated using the equation:

$$\% \text{ Adj. Acid} = \frac{A}{W \times M} \times \frac{100\%}{K}$$

where

%  Adj. Acid = the percent adjacent acid based on the total acid present

A = infrared absorbance of the sample at 5.65 microns

W = the weight of sample per 100 ml solution

M = the fractional concentration of acid in the copolymer

K = the calibration constant obtained at 5.65 microns with glutaric anhydride, which equals 3.2 in the I.R. equipment which we used with a 0.5 mm cell.

The value of the Percent Adjacent Acid obtained in this way is the same both on weight and mole basis. The pyrolysis also converts some of the isolated methacrylic acid units to anhydride, but the linear anhydride absorbs sharply at 5.53 microns and does not interfere seriously with the determination of the cyclic anhydride at the 5.65 micron wavelength.

The precision of the test method for percent adjacent acid was determined to be ±0.8 percent adjacent acid (95% confidence limit) at a level of 5% adjacent acid. This method will not measure with accuracy the true amount of methacrylic acid in sequences longer than one (i.e., total amount of methacrylic acid diads, triads, tetrads, etc.) for copolymers that contain large amounts of sequences longer than diads. The polymers of this invention do not contain significant amounts of such because of the low molar concentrations of acid comonomer; for example, even a copolymer containing 35 weight percent comonomer will have less than 3% of its comonomer in triads which will be measured as 2% in diads for an error of 1%. For lower total weight percent comonomer, the amount in triads is greatly diminished. For the purposes of the present invention sequences longer than diads are not considered. The novel copolymers of the present invention are characterized by the property "Percent Adjacent Acid" as measured by the test described above.

The ratio of % Adj. Acid to total weight of MAA is obtained by divising the measured value of the "Weight Percent Adjacent Acid" by the measured value of the "Weight Percent Methacrylic Acid".

Melt index is measured by ASTM D-1238-57T (condition E) in g/10 minutes.

Stiffness is measured by ASTM D-747-58T in kpsi = 1000 lb/sq in.

Flexural Modulus is measured by ASTM D-790 in kpsi = 1000 lb/sq in.

Vicat temperature is measured by ASTM D-1525-58T using a 1.00 kg load. Tensile yield strength in psi are determined on die cut specimens (using a modified die C of ASTM D-412-51T) pulled at 2 inches per minute.

Transparency was determined by looking through a 0.07 inch thick compression molded sheet and observing the distance in cm (recorded as the transparency) that a test pattern could be moved away from the sheet before the pattern became blurred.

"ND" in the Tables signifies that the value was not determined.

Table I shows a series of polymers synthesized to about 10% methacrylic acid. Comparative Examples 1 to 6 are control runs that produced substantially random copolymers that have low ratio of weight percent adjacent acid to weight percent methacrylic acid for comparison and are not examples of the copolymers of this invention. Examples 1 through 9 are examples of the present invention and have weight percent adjacent acid to weight percent methacrylic acid ratios of 0.44 or above. They show significantly higher stiffnesses, Vicat temperatures and tensile yield strengths than copolymers with low ratios. Example 10 is an intermediate case not with the claimed invention.

In Table I the melt indexes of Examples 1 through 7 cover a wide range (0.012 to 430) without a large effect on the properties. Examples 8 to 10 and C-1 to C-3 show that the higher weight percent adjacent acid to weight percent methacrylic acid ratios are obtained as we reduce the synthesis pressure at constant temperature. A comparison of Examples 1 through 8 with Examples 10 and C-1 at 24 kpsi and of Example C-4 with Examples C-5 and C-6 at 27 kpsi shows that higher percent adjacent acid to percent methacrylic acid ratios are obtained as synthesis temperatures are reduced. A comparison of Examples C-3 with Examples C-5 and C-6 shows that higher percent adjacent acid to percent methacrylic acid ratios are produced as the conversion to polymer is decreased.

TABLE I

| Ex. | Synth. Cond. T (°C.) | P (KPSI) | Conv. (%) | MAA (Wt. %) | % Adj. MAA (%) | Ratio of % Adj. MAA to % MAA | M.I. | D-747 Stiffness (KPSI) | Vicat T (°C.) | TYS[1] (PSI) |
|---|---|---|---|---|---|---|---|---|---|---|
| 1 | 160 | 24 | 12.4 | 10.7 | 6.6 | 0.61 | 0.012 | 24.8 | 85 | 1240 |
| 2 | 160 | 24 | 11.9 | 11.1 | 6.2 | 0.54 | 0.022 | 27.5 | 84 | 1220 |
| 3 | 160 | 24 | 12.2 | 9.2 | 6.9 | 0.75 | 0.19 | 27.2 | 88 | 1270 |

TABLE I-continued

| Ex. | Synth. Cond. T (°C.) | Synth. Cond. P (KPSI) | Conv. (%) | MAA (Wt. %) | % Adj. MAA (%) | Ratio of % Adj. MAA to % MAA | M.I. | Properties D-747 Stiffness (KPSI) | Vicat T (°C.) | TYS[1] (PSI) |
|---|---|---|---|---|---|---|---|---|---|---|
| 4 | 160 | 24 | 12.4 | 9.7 | 7.3 | 0.75 | 1.98 | 36.1 | 91 | 1450 |
| 5 | 160 | 24 | 12.4 | 11.0 | 7.9 | 0.72 | 5.33 | 31.9 | 87 | 1500 |
| 6 | 160 | 24 | 12.5 | 11.2 | 6.5 | 0.58 | 106 | 36.4 | 83 | 1350 |
| 7 | 160 | 24 | 12.3 | 10.7 | 7.0 | 0.65 | 430 | 48.5 | 81 | 1510 |
| 8[2] | 245 | 21.3 | 11.5 | 9.6 | 9.5 | 0.99 | 18 | 24.5 | ND | 1300 |
| 9[2] | 248 | 22.3 | 10.0 | 10.4 | 5.1 | 0.49 | 16 | 17.9 | ND | 1060 |
| 10[2] | 251 | 24.0 | 10.5 | 10.1 | 4.2 | 0.42 | 25 | 12.0 | ND | 990 |
| C-1[2] | 250 | 24.0 | 10.9 | 10.4 | 4.1 | 0.39 | 43 | 12.0 | ND | 950 |
| C-2[2] | 249 | 25.3 | 10.7 | 10.7 | 3.2 | 0.33 | 31 | 13.5 | ND | 965 |
| C-3[2] | 250 | 27.2 | 11.0 | 9.4 | 2.2 | 0.23 | 21 | 12.2 | ND | 950 |
| C-4 | 205 | 27 | 13.7 | 9.8 | 2.3 | 0.23 | 1.5 | 15.2 | 82 | 1000 |
| C-5 | 250 | 27 | 14.4 | 9.8 | 1.2 | 0.12 | 234 | 12.3 | 67 | 810 |
| C-6 | 251 | 27 | 14.7 | 8.2 | 1.2 | 0.15 | 32.7 | 12.2 | 76 | 940 |

[1] Tensile yield strength
[2] These runs were made in the 2.0 liter autoclave. All other runs were made in the 0.72 liter autoclave.

EXAMPLES 11 TO 17 AND COMPARATIVE EX. C-7 TO C-11

Following the procedure of the preceding examples ethylene and methacrylic acid were copolymerized to products containing 13 to 17% methacrylic acid in a series of runs summarized in Table II. Examples C-7 to C-11 are control runs that have low percent adjacent acid to percent methacrylic acid ratios for comparison and are not examples of the copolymers of this invention. Examples 11 to 17 are examples of this invention; they have weight percent adjacent acid to percent methacrylic acid ratios of 0.44 or above. They show significantly higher stiffnesses, Vicat temperatures and yield strengths than the copolymers with low percent adjacent acid to percent methacrylic acid ratios. The effect was more marked at about 15% by weight methacrylic acid (Table II) than it was at about 10% by weight methacrylic acid (Table I).

In Table II the melt indexes in Examples 11 through 17 show a wide range (0.024 to 620) without a large effect on the properties. Even Examples C-7 through C-11 also show that higher percent adjacent acid to percent methacrylic acid ratios are obtained as synthesis temperatures are reduced.

TABLE II

| Ex. | Synth. Cond. T (°C.) | Synth. Cond. P (KPSI) | Conv. (%) | MAA (Wt. %) | % Adj. MAA (%) | Ratio of % Adj. MAA to % MAA | M.I. | Properties D-747 Stiffness (KPSI) | Vicat T (°C.) | TYS[1] (PSI) |
|---|---|---|---|---|---|---|---|---|---|---|
| 11 | 160 | 24 | 12.1 | 13.1 | 9.6 | 0.73 | 0.024 | 28.2 | ND | 1670 |
| 12 | 160 | 24 | 12.9 | 14.4 | 8.5 | 0.59 | 0.23 | 36.6 | 80 | 1630 |
| 13 | 160 | 24 | 11.8 | 16.7 | 10.9 | 0.65 | 0.87 | 40.8 | 70 | 1660 |
| 14 | 160 | 24 | 12.4 | 16.5 | 7.3 | 0.44 | 1.40 | 29.7 | 68 | 1760 |
| 15 | 160 | 24 | 11.5 | 15.0 | 9.1 | 0.61 | 48 | 28.7 | 71 | 1280 |
| 16 | 160 | 24 | 12.5 | 14.2 | 9.0 | 0.63 | 260 | 45.6 | 73 | 1550 |
| 17 | 160 | 24 | 12.9 | 15.4 | 10.0 | 0.65 | 620 | 34.6 | 68 | 1400 |
| C-7[2] | 220 | 27 | 13.9 | 17.0 | 6.1 | 0.36 | 39 | 12.3 | 62 | 1100 |
| C-8[2] | 225 | 27 | 13.6 | 16.6 | 4.7 | 0.29 | 63 | 11.0 | ND | 1150 |
| C-9[2] | 240 | 27 | 14.1 | 16.4 | 4.3 | 0.26 | 200 | 7.8 | 54 | 920 |
| C-10[2] | 250 | 27 | 14.1 | 15.8 | 3.4 | 0.22 | 470 | 7.5 | ND | 820 |
| C-11[2] | 250 | 27 | 14.0 | 14.5 | 2.9 | 0.20 | 220 | 7.9 | ND | 925 |

[1] Tensile yield strength
[2] These products were made in the 2.0 liter autoclave. All other products were made in the 0.72 liter autoclave.

EXAMPLES 18 TO 20 AND COMPARATIVE EXAMPLES C-12 TO C-14

Following the procedure of the preceding examples ethylene and methacrylic acid were copolymerized to products containing 18 to 20% methacrylic acid in a series of runs summarized in Table III. Examples C-12 through C-14 are control runs that produced substantially random copolymers having low percent adjacent acid to total weight percent methacrylic acid ratios for comparison and are not examples of the copolymers of this invention. Examples 18 through 20 are examples of this invention; they have percent adjacent acid to percent methacrylic acid ratios above 0.44. They show significantly higher stiffnesses, Vicat temperatures, and tensile yield strengths than the copolymers with the low percent adjacent acid to percent methacrylic acid ratios of Examples C-12 to C-14. The effect was more marked at approximately 19% methacrylic acid level (Table III) than it was at about 10% or about 15% methacrylic acid (Tables I and II, respectively).

TABLE III

| Ex. | Synth. Cord. T (°C.) | Synth. Cord. P (KPSI) | Conv. (%) | MAA (Wt. %) | % Adj. MAA (%) | Ratio of % Adj. MAA to % MAA | M.I. | D-747 Stiffness (KPSI) | Vicat T (°C.) | TYS[1] (PSI) |
|---|---|---|---|---|---|---|---|---|---|---|
| 18 | 160 | 24 | 12.6 | 18.0 | 13.8 | 0.77 | 0.22 | 43.9 | 62 | 1720 |
| 19 | 160 | 24 | 13.2 | 19.5 | 12.5 | 0.64 | 220 | 60.0 | 61 | 1880 |
| 20 | 160 | 24 | 12.8 | 19.9 | 11.1 | 0.56 | 660 | 37.4 | 57 | 1410 |
| C-12[2] | 240 | 24 | 16.3 | 19.9 | 3.9 | 0.20 | 650 | 5.3 | ND | 935 |
| C-13[2] | 245 | 24 | 14.5 | 18.9 | 4.8 | 0.25 | 790 | 4.3 | 47 | 890 |
| C-14[2] | 252 | 27 | 14.2 | 17.8 | 3.9 | 0.22 | 357 | 6.1 | 54 | 925 |

[1] Tensile yield strength
[2] These products were made in the 2.0 liter autoclave. All other products were made in the 0.72 liter autoclave.

EXAMPLES 21 TO 23 AND COMPARATIVE EXAMPLES C-15 TO C-24

Following the procedure of the preceding examples, ethylene and methacrylic acid were copolymerized to products containing 22 to 25% methacrylic acid in a series of runs summarized in Table IV. Examples C-15 through C-24 are control runs that produced substantially random copolymers having low percent adjacent acid to percent methacrylic acid ratios for comparison and are not examples of the copolymers of this invention. Examples 21 through 23 are examples of the copolymers of this invention; they have percent adjacent acid to total percent methacrylic acid ratios above 0.44. They show significantly higher stiffnesses, Vicat temperatures and tensile yield strengths than the control polymers of Examples C-15 to C-24. The effect on properties was more marked at the approximately 23.5% methacrylic acid level (Table IV) than it was at about 10%, 15% or 19% methacrylic acid. The trends with synthesis temperature and pressure (C-15 through C-21 at 24 kpsi and C-22 through C-24 at 27 kpsi) were not as significant for this higher comonomer content as they were with lower comonomer contents, (cf. Tables I and II). However, the desirable properties were obtained at the preferred conditions.

EXAMPLES 24–25 AND COMPARATIVE EXAMPLE C-25

Following the procedure of the preceding examples, ethylene and methacrylic acid were copolymerized to products containing 32 to 35% methacrylic acid in a series of runs summarized in Table V. Example C-25 is a control run that produced a substantially random copolymer having a low percent adjacent acid to total percent methacrylic acid ratio for comparison and is not an example of the copolymers of this invention. Examples 24–25 are examples of the copolymers of this invention; they have percent adjacent acid to total percent methacrylic acid ratios above 0.44. They show significantly higher stiffnesses, Vicat temperatures and tensile yield strengths than the control polymer of C-25. The effect on properties at the approximately 33% methacrylic acid level (Table V) was significant but not as marked as at about 23.5% methacrylic acid (Table IV).

The compositionally uniform but nonrandom copolymers of the invention can be converted to ionomers by partial neutralization of the acid units in the copolymers with metallic basis. This neutralization can be carried out with metal cations having an ionized valence of from one to three inclusive, when the unsaturated acid comonomer is a monocarboxylic acid and an ionized valence of one when the unsaturated acid is a dicarboxylic acid, and said metal ions being selected from the group consisting of uncomplexed and complexed metal ions, said ionomer having a melt index, after neutralization, of from about 0.01 to about 100 and a ratio of weight percent adjacent acid groups to total weight percent acid in the copolymer of from about 0.44 to about 1.0. By complexed ions is meant complexed ions as defined in Rees, U.S. Pat. No. 3,264,272.

TABLE IV

| Ex. | Synth. Cond. T (°C.) | Synth. Cond. P (KPSI) | Conv. (%) | MAA (Wt. %) | % Adj. MAA (%) | Ratio of % Adj. MAA to % MAA | M.I. | D-747 Stiffness (KPSI) | Vicat T (°C.) | TYS[1] (PSI) |
|---|---|---|---|---|---|---|---|---|---|---|
| 21[2] | 161 | 24 | 11.2 | 24.9 | 13.6 | 0.55 | 0.47 | 74.2 | 58 | 3140 |
| 22 | 160 | 24 | 12.0 | 23.0 | 12.6 | 0.55 | 1.51 | 65.1 | 56 | 2450 |
| 23 | 160 | 24 | 12.6 | 21.6 | 13.9 | 0.64 | 6.55 | 63.5 | 58 | 2420 |
| C-15[2] | 220 | 24 | 14.7 | 23.9 | 5.5 | 0.23 | 290 | 7.39 | ND | 1230 |
| C-16[2] | 240 | 24 | 14.4 | 22.7 | 4.5 | 0.20 | 790 | 3.12 | ND | 890 |
| C-17[2] | 245 | 24 | 15.4 | 24.1 | 5.6 | 0.23 | 1100 | 4.86 | ND | 1040 |
| C-18[2] | 245 | 24 | 15.9 | 24.0 | 5.6 | 0.23 | 1400 | 4.41 | ND | 1010 |
| C-19[2] | 245 | 24 | 15.4 | 24.3 | 5.3 | 0.22 | 1500 | 4.0 | 40 | 1040 |
| C-20 | 250 | 24 | 13.4 | 21.9 | 7.4 | 0.34 | 1200 | 4.6 | 40 | ND |
| C-21 | 250 | 24 | 13.6 | 22.3 | 3.1 | 0.14 | 1300 | 4.8 | 41 | 870 |
| C-22[2] | 235 | 27 | 14.3 | 23.3 | 6.3 | 0.27 | 480 | 5.6 | 42 | 1100 |
| C-23[2] | 240 | 27 | 14.4 | 23.0 | 6.3 | 0.27 | 780 | 10.3 | 43 | 950 |
| C-24[2] | 245 | 27 | 14.5 | 22.1 | 5.4 | 0.24 | 910 | 6.0 | 42 | 850 |

[1] Tensile yield strength
[2] These products were made in the 2.0 liter autoclave. All other products were made in the 0.72 liter autoclave.

TABLE V

| Ex. | Synth. Cond.[2] T (°C.) | P (KPSI) | Conv. (%) | MAA (Wt. %) | % Adj. MAA (%) | Ratio of % Adj. MAA to % MAA | M.I. | D-747 Stiffness (KPSI) | Vicat T (°C.) | TYS[1] (PSI) |
|---|---|---|---|---|---|---|---|---|---|---|
| 24 | 171 | 30 | 9.8 | 32.6 | 16.0 | 0.49 | 0.33 | 50.5 | 57 | 3190 |
| 25 | 171 | 30 | 9.8 | 34.5 | 19.6 | 0.57 | 0.63 | 59 | 61 | 3380 |
| C-25 | 250 | 24 | 13.7 | 32.5 | 11.1 | 0.34 | 1540 | 27.7 | 41 | 1580 |

[1]Tensile yield strength
[2]All products were made in the 0.72 liter autoclave.

EXAMPLES 26 TO 36

Copolymers of ethylene and methacrylic acid having percent adjacent acid to percent methacrylic acid ratios above 0.44 made in accordance with the procedure of the preceding examples were partially neutralized by adding antioxidant, sodium hydroxide and water to the molten copolymer on a two-roll rubber mill at 140° C. and milling for 10 minutes after the addition to insure mixing, complete reaction and removal of the water. The starting copolymers (identified by run numbers from preceding examples) and the ionomer products from the partial neutralizations (Examples 26 through 36) are summarized in Table VI. Two levels of neutralization were used: (1) 1.86 g sodium hydroxide per 100 g copolymer to neutralize 4.0 g methacrylic acid units per 100 g copolymer, and (2) 3.25 g sodium hydroxide per 100 g copolymer to neutralize 7.0 g methacrylic acid units per 100 g copolymer. The 3.25 g NaOH/100 g copolymer gave 76% neutralization at 9.2% comonomer (Example 26), 47% neutralization at 15.0% comonomer (Example 32), and 28% neutralization at 24.9% comonomer (Example 36).

The ionomers produced from these copolymers (as compared to the copolymers themselves) generally showed a drastic decrease in melt index, a small increase in stiffness, no significant change in Vicat temperature, a significant increase in tensile yield strength and an improvement in transparency. These products are similar to ionomers obtained from random copolymers of ethylene and methacrylic acid prepared according to U.S. Pat. No. 3,264,272 sold by E. I. du Pont de Nemours & Co. as Surlyn ® ionomer resins for various applications, except that the ionomers of the present invention are stiffer and have better heat resistance. Higher stiffness and heat resistance makes the product more useful in applications such as sealing layers on film, blister packs, motor oil packages, refrigerator liners and the like.

TABLE VI

| Ex. | Synth. Cond. T (°C.) | P (KPSI) | Conv. (%) | G. NaOH Added Per 100G Polymer | MAA (%) | Adj. MAA (%) | Ratio of % Adj. MAA to Total % MAA | M.I. | D-747 Stiffness (KPSI) | Vicat T (°C.) | TYS[1] (PSI) | RT[2] |
|---|---|---|---|---|---|---|---|---|---|---|---|---|
| 3 | 160 | 24 | 12.2 | 0 | 9.2 | 6.9 | .75 | 0.19 | 27.2 | 88 | 1270 | |
| 26 | 160 | 24 | 12.2 | 3.25 | 9.2 | 6.9 | .75 | 0.004 | 32.0 | 85 | 1530 | >500 |
| 6 | 160 | 24 | 12.5 | 0 | 11.2 | 6.5 | .58 | 106 | 36.4 | 83 | 1350 | 5 |
| 27 | 160 | 24 | 12.5 | 3.25 | 11.2 | 6.5 | .58 | 2.95 | 41.7 | 84 | 2190 | >500 |
| 7 | 160 | 24 | 12.3 | 0 | 10.7 | 7.0 | .65 | 430 | 48.5 | 81 | 1510 | 0.2 |
| 28 | 160 | 24 | 12.3 | 3.25 | 10.7 | 7.0 | .65 | 12.8 | 45.8 | 88 | 2140 | >500 |
| 13 | 160 | 24 | 11.8 | 0 | 16.7 | 10.9 | .65 | 0.87 | 40.8 | 70 | 1660 | 40 |
| 29 | 160 | 24 | 11.8 | 3.25 | 16.7 | 10.9 | .65 | 0.082 | 51.8 | 70 | 2500 | >500 |
| 14[3] | 160 | 24 | 12.4 | 0 | 16.5 | 7.3 | .44 | 1.40 | 29.7 | 68 | 1760 | 70 |
| 30[3] | 160 | 24 | 12.4 | 1.86 | 16.5 | 7.3 | .44 | 0.26 | 50.3 | 70 | ND | >500 |
| 31[3] | 160 | 24 | 12.4 | 3.25 | 16.5 | 7.3 | .44 | 0.18 | 51.0 | 66 | ND | >500 |
| 16 | 160 | 24 | 12.5 | 0 | 14.2 | 9.0 | .63 | 260 | 73 | 1550 | 80 | |
| 32 | 160 | 24 | 12.5 | 3.25 | 14.2 | 9.0 | .63 | 11 | .48 | 74 | 2500 | >500 |
| 17 | 160 | 24 | 12.9 | 0 | 15.4 | 10.0 | .59 | 620 | 34.6 | 68 | 1400 | 8 |
| 33 | 160 | 24 | 12.9 | 3.25 | 15.4 | 10.0 | .59 | 45 | 52.4 | 70 | 2670 | >500 |
| 18 | 160 | 24 | 12.6 | 0 | 18.0 | 12.8 | .77 | 0.22 | 43.9 | 62 | 1720 | 5 |
| 34 | 160 | 24 | 12.6 | 3.25 | 18.0 | 13.8 | .77 | 0.028 | 60.4 | 70 | 2860 | 500 |
| 21[3] | 161 | 24 | 11.2 | 0 | 24.9 | 13.6 | .55 | 0.47 | 74.2 | 58 | 3140 | 200 |
| 35[3] | 161 | 24 | 11.2 | 1.86 | 24.9 | 13.6 | .55 | 0.12 | 83.9 | 64 | ND | >500 |
| 36[3] | 161 | 24 | 11.2 | 3.25 | 24.9 | 13.6 | .55 | 0.044 | 89.0 | 68 | ND | >500 |

[1]Tensile yield strength
[2]Relative transparency
[3]These products were made in the 2.0 liter autoclave. The other products were made in the 0.72 liter autoclave.

We claim:

1. A compositionally uniform but nonrandom copolymer of ethylene and α,β-ethylenically unsaturated carboxylic acid, said acid having from 3 to 8 carbon atoms and said copolymer containing on a weight basis from about 6 to about 35 percent acid, having a melt index of from about 0.1 to about 800, and having a ratio of weight percent adjacent acid to weight percent acid in the copolymer of from about 0.44 to about 1.0.

2. The copolymer of claim 1 containing on a weight basis in excess of 10 to about 25 percent acid and having a melt index of from about 0.2 to 30.

3. The copolymer of claim 2 having a ratio of percent adjacent acid to weight percent acid in the copolymer of from about 0.5 to about 0.8.

4. The copolymer of claim 3 wherein said α,β-ethylenically unsaturated carboxylic acid is methacrylic acid.

5. The copolymer of claim 4 containing on a weight basis in excess of 10 to about 18 percent acid.

6. A compositionally uniform but nonrandom ionomer of ethylene and α,β-ethylenically unsaturated carboxylic acid, said acid having from 3 to 8 carbon atoms, said copolymer containing, on a weight basis, from about 6 to about 35 percent acid, having from about 5 percent to about 90 percent of the carboxylic acid groups ionized by neutralization with metal cations having an ionized valence of from one to three inclusive, when the unsaturated acid is a monocarboxylic acid, and an ionized valence of one, when the unsaturated acid is a dicarboxylic acid and said metal cations being selected from the group consisting of uncomplexed and complexed metal ions, said ionomer having a melt index of from about 0.01 to about 100 and a ratio of weight percent adjacent acid to weight percent acid in the copolymer of from about 0.44 to about 1.0.

7. The ionomer of claim 6 containing on a weight basis of 10 to about 25 percent acid and having a melt index of from about 0.2 to about 30.0.

8. The ionomer of claim 7 having a ratio of weight percent adjacent acid to weight percent acid in the copolymer of from about 0.5 to about 0.8.

9. The ionic copolymer of claim 8 wherein said α,β-ethylenically unsaturated carboxylic acid is methacrylic acid.

10. The ionomer of claim 9 containing on a weight basis in excess of 10 to about 18 percent acid.

11. A process of preparing in a constant environment stirred autoclave a compositionally uniform but nonrandom copolymer of ethylene and an α,β-ethylenically unsaturated carboxylic acid, said acid having from 3 to 8 carbon atoms and said copolymer containing, on a weight basis, from about 6 to about 35 percent acid, having a melt index of from about 0.1 to about 800, and having a ratio of weight percent adjacent acid to weight percent acid in the copolymer of from about 0.44 to about 1.0, said process comprising continuously charging ethylene, said acid and free radical initiator into a reaction zone maintained in a steady state at a pressure of from 0 to about 50 psi above, and at a temperature of from 0° to about 15° C. above that needed to maintain a single phase reaction mixture at the given concentration of copolymer in the reaction mixture and at the given acid comonomer concentration in the copolymer, the ethylene and acid being charged in a ratio of from about 15:1 to about 200:1, respectively, converting from about 5 to about 20 percent by weight of the monomers to copolymer, and continuously removing the copolymer and unreacted monomer from the reaction zone.

12. The process of claim 11 wherein the ethylene and acid is charged in a ratio of from about 20:1 to about 100:1, respectively.

13. The process of claim 12 wherein from about 8 to about 16 percent by weight of the monomers is converted to copolymer.

14. The process of claim 11 wherein the acid is methacrylic acid.

15. The process of claim 14 wherein the copolymer has a ratio of percent adjacent acid to weight percent acid in the copolymer of from about 0.5 to about 0.8.

16. The process of claim 15 wherein the reaction zone is maintained at a temperature of from about 150° to about 175° C. and at a pressure of from about 23,500 to about 24,500 psi.

17. The process of claim 16 wherein the ethylene and acid is charged in a ratio of from about 20:1 to about 100:1.

18. The process of claim 17 wherein from about 8 to about 16 percent by weight of the monomers is converted to copolymer.

* * * * *

Dedication 4,248,990.—*Edwin Thomas Pieski*, Fairfax and *Thomas Fujio Sashihara*, Wilmington, Del. NONRANDOM COPOLYMERS OF ETHYLENE AND UNSATURATED ACID. Patent dated Feb. 3, 1981. Dedication filed May 6, 1986, by the assignee, *E. I. Du Pont de Nemours and Co.*

Hereby dedicates to the Public the entire remaining term of said patent.
[*Official Gazette July 8, 1986.*]